United States Patent [19]
Frey

[11] Patent Number: 6,015,932
[45] Date of Patent: Jan. 18, 2000

[54] REACTIVATION OF A HIGH-ACTIVITY ISOMERIZATION CATALYST

[75] Inventor: Stanley J. Frey, Palatine, Ill.

[73] Assignee: UOP LLC, Des Plaines, Ill.

[21] Appl. No.: 09/143,069

[22] Filed: Aug. 28, 1998

[51] Int. Cl.$^7$ ..................................................... B01J 27/02
[52] U.S. Cl. ........................... 585/751; 585/750; 502/30; 502/31; 208/140
[58] Field of Search .................................. 585/750, 751; 502/30, 31; 208/140

[56] References Cited

U.S. PATENT DOCUMENTS

| | | | |
|---|---|---|---|
| 5,036,035 | 7/1991 | Baba et al. | 502/221 |
| 5,362,694 | 11/1994 | Hollstein et al. | 502/52 |
| 5,675,048 | 10/1997 | Zhang et al. | 585/467 |

FOREIGN PATENT DOCUMENTS 0 666 109 A1   8/1995   European Pat. Off. ....... B01J 27/053

*Primary Examiner*—Walter D. Griffin
*Assistant Examiner*—In Suk Bullock
*Attorney, Agent, or Firm*—Thomas K. McBride; John F. Spears, Jr.; Richard E. Conser

[57] ABSTRACT

A reactivation process is disclosed for a catalyst formulated to selectively upgrade naphtha to obtain an isoparaffin-rich product for blending into gasoline. The process utilizes a solid strong-acid catalyst comprising an anion-modified metal oxide, preferably comprising a sulfated support of an oxide or hydroxide of a Group IVB (IUPAC 4) metal, and a platinum-group metal component.

20 Claims, 2 Drawing Sheets

REACTIVATION OF A HIGH-ACTIVITY ISOMERIZATION CATALYST

BACKGROUND OF THE INVENTION

1. Field of the Invention

This invention relates to an improved process for the conversion of hydrocarbons, and more specifically for the selective upgrading of naphtha by isomerization.

2. General Background

The widespread removal of lead antiknock additive from gasoline and the rising fuel-quality demands of high-performance internal-combustion engines have compelled petroleum refiners to install new and modified processes for increased "octane," or knock resistance, in the gasoline pool. Refiners have relied on a variety of options to upgrade the gasoline pool, including higher- severity catalytic reforming, higher FCC (fluid catalytic cracking) gasoline octane, isomerization of light naphtha and the use of oxygenated compounds. Such key options as increased reforming severity and higher FCC gasoline octane result in a higher aromatics content of the gasoline pool, through the production of high- octane aromatics at the expense of low-octane heavy paraffins.

Currently, refiners are faced with the prospect of supplying reformulated gasoline to meet tightened automotive emission standards. Reformulated gasoline differs from the traditional product in having a lower vapor pressure, lower final boiling point, increased content of oxygenates, and lower content of olefins, benzene and aromatics. Benzene content generally is being restricted to 1% or lower, and is limited to 0.8% in U.S. reformulated gasoline. Gasoline aromatics content is likely to be lowered, particularly as distillation end points (usually characterized as the 90% distillation temperature) are lowered, since the high-boiling portion of the gasoline which thereby would be eliminated usually is an aromatics concentrate. Since aromatics have been the principal source of increased gasoline octanes during the recent lead-reduction program, severe restriction of the benzene/aromatics content and high-boiling portion will present refiners with processing problems. Such problems have been addressed through such technology as isomerization of light naphtha to increase its octane number, isomerization of butanes as alkylation feedstock, and generation of additional light olefins through fluid catalytic cracking and dehydrogenation as feedstock for alkylation and production of oxygenates. This issue often has been addressed by raising the cut point between light and heavy naphtha, increasing the relative quantity of naphtha to an isomerization unit. The performance and stability of naphtha isomerization units thus are increasingly important in refinery planning.

U.S. Pat. No. 5,036,035 (Baba et al.) teaches a catalyst, and its use in isomerization, containing sulfate, zirconium oxide or hydroxide and a platinum- group metal; coverage is restricted to a catalyst consisting essentially of these components. European patent application 0,666,109 A1 discloses a sulfated catalyst, and use in isomerization, comprising an oxide or hydroxide of Group III or Group IV; oxide or hydroxide of Groups V, VI or VII; oxide or hydroxide of Group VIII; and a component from a list of Group VIII metals and metal combinations. These references disclose prereduction of the catalyst before use in isomerization, but are silent with respect to regeneration.

U.S. Pat. No. 5,675,048 (Zhang et al.) teaches a fluidized-bed alkylation process with two regeneration zones, one based upon mild hydrogenative washing for partial regeneration and one based on higher-temperature regeneration with liquid-phase hydrocarbons containing dissolved hydrogen.

The state of the art in regeneration of solid superacid catalysts is represented by U.S. Pat. No. 5,362,694 (Hollstein et al). Conventional regeneration by adding oxygen or air in increasing amounts to an inert atmosphere while heating the catalyst to 350 to 450° C. is followed by introducing 1 to 20% sulfur dioxide into the stream. The procedure is said to be particularly useful for the regeneration of sulfated superacid zirconia catalysts, exemplified by activity improvement of such catalysts used in paraffin isomerization.

The problem facing workers in the art, therefore, is to find efficient and effective methods of reactivating superacid catalysts used in paraffin isomerization.

SUMMARY OF THE INVENTION

It is an object of the present invention to provide improved technology to upgrade naphtha to gasoline. A specific object is to provide an improved process for the isomerization of light naphtha to obtain a high octane gasoline component.

This invention is based on the discovery that a superacid catalyst used in the isomerization of light naphtha to increase its isoparaffin content can be effectively reactivated using hydrocarbons containing dissolved hydrogen in the liquid phase.

A broad embodiment of the present invention is directed to a process for the isomerization of isomerizable hydrocarbons using a solid superacid catalyst which becomes deactivated in the isomerization process, wherein the deactivated catalyst is reactivated to restore isomerization activity by contacting with a liquid hydrocarbon stream at a reactivation temperature at least 20° C. lower than the temperature at which isomerization is effected. The reactivation temperature is preferably at least about 30° C., and more preferably about 50° C., lower than the isomerization temperature. Reactivation conditions usually comprise a temperature of from about 20 to 200° C., pressure of from 300 kPa to 4 MPa, and liquid hourly space velocity of from 0.5 to 15 hr$^{-1}$.

The isomerizable hydrocarbons preferably are contained in light naphtha which is isomerized to increase its isoparaffin content and octane number as a gasoline blending stock. Isomerization conditions optimally comprise a temperature of from about 40 to 250° C., pressure of from 100 kPa to 10 MPa, and liquid hourly space velocity of from 0.2 to 25 hr$^{-1}$.

The process of the present invention utilizes a solid strong-acid catalyst comprising an anion-modified metal oxide and a zerovalent Group VIII (IUPAC 8–10) metal. The anion modifier generally is selected from one or more of sulfate and the oxide, hydroxide, oxyhydroxide or oxide-hydrate of metals of Groups VB (IUPAC 5), VIB (IUPAC 6), VIIB (IUPAC 7), VIII (IUPAC 8–10) and VA (IUPAC 15). Preferably the catalyst comprises a sulfated support of an oxide or hydroxide of a Group IVB (IUPAC 4) metal, especially zirconium oxide or hydroxide. The preferred zerovalent Group VIII (IUPAC 8–10) metal is selected from one or more of the platinum-group metals, especially platinum. The catalyst preferably comprises an inorganic-oxide binder, especially alumina.

These as well as other objects and embodiments will become apparent from the detailed description of the invention.

DESCRIPTION OF THE PREFERRED EMBODIMENTS

Figure 1:
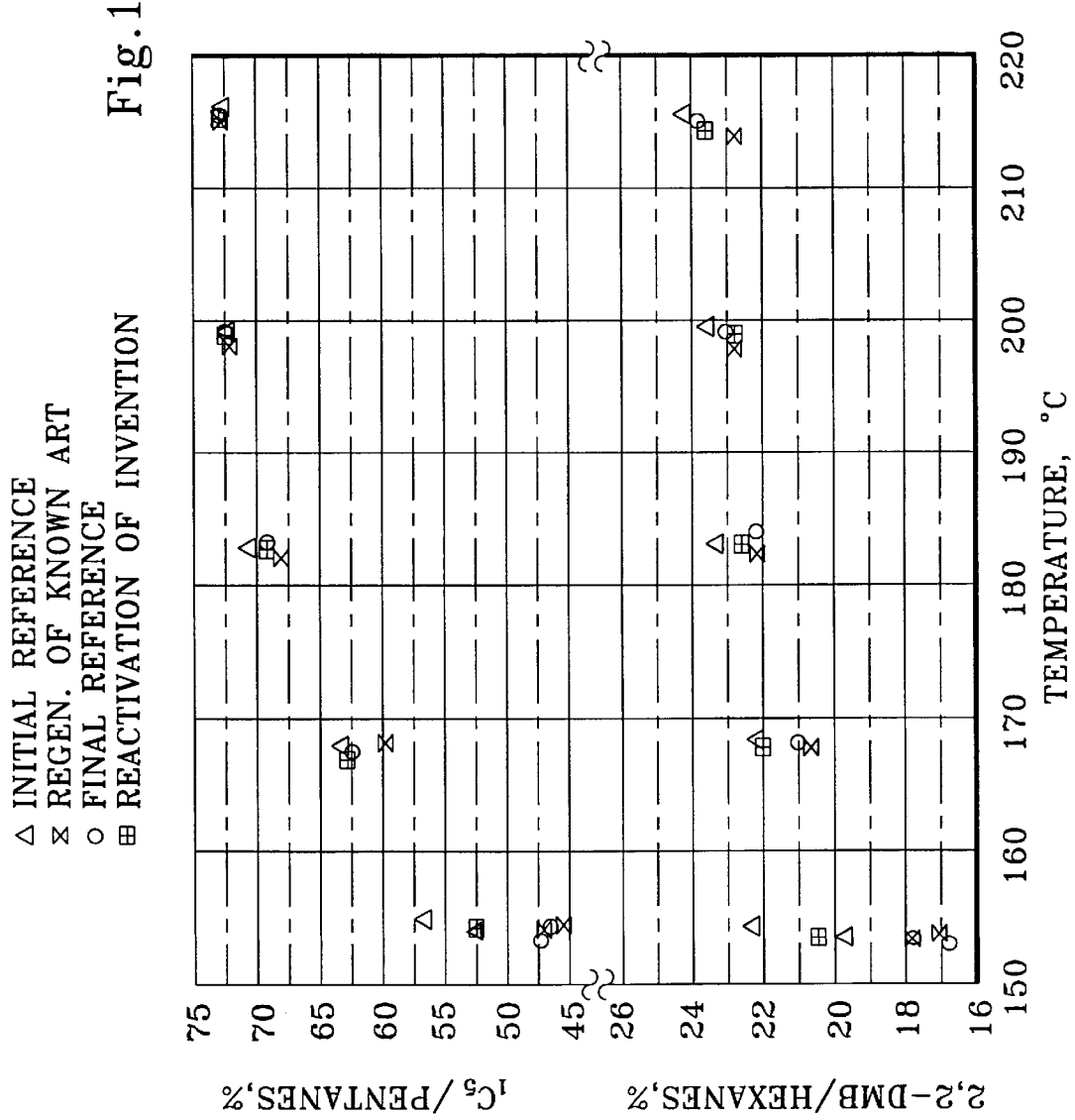
FIG. 1 compares isomerization performance in terms of pentane and hexane product ratios of a catalyst following reactivation according to the invention in relation to regeneration according to the known art.

Feedstock to the present isomerization process comprises paraffins, naphthenes, and aromatics, and may comprise small amounts of olefins, boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. The feedstock essentially is encompassed by the range of a full-range naphtha, or within the range of 0° to 230° C. Usually the feedstock is light naphtha having an initial boiling point of about 10° to 65° C. and a final boiling point from about 75° to 110° C.; preferably, the final boiling point is less than about 95° C.

Naphtha feedstock generally contains small amounts of sulfur compounds amounting to less than 10 mass parts per million (ppm) on an elemental basis. Preferably the naphtha feedstock has been prepared from a contaminated feedstock by a conventional pretreating step such as hydrotreating, hydrorefining or hydrodesulfurization to convert such contaminants as sulfurous, nitrogenous and oxygenated compounds to $H_2S$, $NH_3$ and $H_2O$, respectively, which can be separated from hydrocarbons by fractionation. This conversion preferably will employ a catalyst known to the art comprising an inorganic oxide support and metals selected from Groups VIB(IUPAC 6) and VIII(IUPAC 9–10) of the Periodic Table. Water can act to attenuate catalyst acidity by acting as a base, and sulfur temporarily deactivates the catalyst by platinum poisoning. Feedstock hydrotreating as described hereinabove usually reduces water-generating oxygenates and deactivating sulfur compounds to suitable levels, and other means such as adsorption systems for the removal of sulfur and water from hydrocarbon streams generally are not required. It is within the ambit of the present invention that this optional pretreating step be included in the present process combination.

The principal components of the preferred feedstock are alkanes and cycloalkanes having from 4 to 7 carbon atoms per molecule ($C_4$ to $C_7$), especially $C_5$ to $C_6$, and smaller amounts of aromatic and olefinic hydrocarbons also may be present. Usually, the concentration of $C_7$ and heavier components is less than about 20 mass % of the feedstock. Although there are no specific limits to the total content in the feedstock of cyclic hydrocarbons, the feedstock generally contains between about 2 and 40 mass % of cyclics comprising naphthenes and aromatics. The aromatics contained in the naphtha feedstock, although generally amounting to less than the alkanes and cycloalkanes, may comprise from 2 to 20 mass % and more usually 5 to 10 mass % of the total. Benzene usually comprises the principal aromatics constituent of the preferred feedstock, optionally along with smaller amounts of toluene and higher-boiling aromatics within the boiling ranges described above.

The present process optionally may comprise hydrogenation to saturate aromatics for better control of subsequent isomerization temperatures. Hydrogenation generally utilizes a catalyst comprising one or more of nickel and the platinum-group metals on a refractory inorganic-oxide support, with an especially preferred catalyst comprising platinum on a chlorided alumina support. Suitable conditions for aromatics saturation comprise a pressure of from about 100 kPa to 10 MPa absolute, temperature of from about 30° to 200° C., liquid hourly space velocity of from about 0.5 to 20 $hr^{-1}$, and hydrogen-to-hydrocarbon mole ratio of from about 0.1 to 10. A hydrogenation reactor may be in the same hydrogen circuit as the subsequent isomerization process. Further details of the hydrogenation step may be found in U.S. Pat. No. 5,003,118, incorporated herein by reference.

The present process may comprise ring cleavage as an optional feed preparation step, either as an alternative to or in addition to the above hydrogenation step. A variety of catalysts may be suitable, with a preferred catalyst being one or more platinum-group metals on a nonacidic support comprising one or more of a refractory inorganic oxide and a large-pore molecular sieve. Suitable ring-cleavage conditions comprise a pressure of from about 100 kPa to 10 MPa absolute, temperature of from about 100° to 550° C., liquid hourly space velocity of from about 0.2 to 10 $hr^{-1}$, and hydrogen-to- hydrocarbon mole ratio of from about 0.01 to 5. Further details of a ring-cleavage step may be found in U.S. Pat. No. 2,915,571 and U.S. Pat. No. 5,463,155, incorporated herein by reference.

Contacting within the isomerization process may be effected using the catalyst in a fixed-bed system, a moving-bed system, a fluidized-bed system, or in a batch-type operation. A fixed-bed system is preferred. The feedstock and reactants produced in the process may contact the catalyst in either upward, downward, or radial-flow fashion. The reactants may be in the liquid phase, a mixed liquid-vapor phase, or a vapor phase when contacting the catalyst, with excellent results being obtained by application of the present invention to a primarily liquid-phase operation. The catalyst may be in a single reactor or in two or more separate reactors with suitable means therebetween to insure that the desired isomerization temperature is maintained at the entrance to each zone. Two or more reactors in sequence are preferred to enable improved isomerization through control of individual reactor temperatures and for partial catalyst replacement without a process shutdown. The isomerization process yields an isomerized product having an increased isoparaffin content, i.e., and increased content of paraffins having branched chains. Isopentane and the dimethylbutanes are particularly desirable product components.

Isomerization conditions include reactor temperatures usually ranging from about 40° to 250° C. Lower reaction temperatures are generally preferred in order to favor equilibrium mixtures having the highest concentration of high-octane highly branched isoalkanes and to minimize cracking of the feed to lighter hydrocarbons. Temperatures in the range of from about 100° to about 200° C. are preferred in the present invention. Reactor operating pressures generally range from about 100 kPa to 10 MPa absolute, preferably between about 0.5 and 4 MPa. Liquid hourly space velocities range from about 0.2 to about 25 volumes of isomerizable hydrocarbon feed per hour per volume of catalyst, with a range of about 0.5 to 15 $hr^{-1}$ being preferred.

Hydrogen is admixed with the feedstock to provide a mole ratio of hydrogen to hydrocarbon feed of from about 0.01 to 20, preferably from about 0.05 to 5. The hydrogen may be supplied totally from outside the process or supplemented by hydrogen recycled to the feed after separation from reactor effluent. Light hydrocarbons and small amounts of inerts such as nitrogen and argon may be present in the hydrogen. Water should be removed from hydrogen supplied from outside the process, preferably by an adsorption system as is known in the art. In a preferred embodiment the hydrogen to hydrocarbon mol ratio in the reactor effluent is equal to or less than 0.05, generally obviating the need to recycle hydrogen from the reactor effluent to the feed.

During processing the catalyst gradually loses isomerization activity, as evidenced by the need to gradually increase operating temperature in order to maintain product octane number. Since isomer equilibrium is less favorable with respect to octane number at higher temperatures, the catalyst eventually must be replaced or reactivated. Typically a deactivated catalyst comprises carbon accumulated during processing, although the carbon level is low compared to deactivated catalysts from other petroleum refining units. The carbon content of the deactivated catalyst generally is less than about 0.5 mass-%, and usually less than about 0.3 mass-%. A reactivated catalyst usually contains less than about 0.1 mass-% carbon.

According to the present invention, the deactivated catalyst is reactivated to restore isomerization activity by contacting with a liquid hydrocarbon stream at a reactivation temperature at least 20° C. lower than the temperature at which isomerization is effected. The reactivation temperature is selected to effect catalyst reactivation in a minimum time consistent with maintenance of a liquid hydrocarbon reactivation stream and the capabilities (e.g., operating pressure) of the isomerization process unit, and preferably is at least about 30° C., and more preferably about 50° C., lower than the isomerization temperature. Generally free hydrogen is associated with the liquid hydrocarbon stream in an amount of from about 0.01 moles per mole of $C_5+$ hydrocarbons to the hydrogen saturation limit at reactivation conditions. Reactivation conditions usually comprise a temperature of from about 20 to 200° C., pressure of from 300 kPa to 4 MPa, and liquid hourly space velocity of from 0.5 to 15 $hr^{-1}$.

The liquid hydrocarbon reactivation stream preferably comprises feedstock to the present isomerization process as described hereinabove, although the reactivation stream may comprise isomerized product, an intermediate stream in the isomerization process, or another convenient hydrocarbon stream. Preferably the reactivation stream is a naphtha comprising alkanes and cycloalkanes having from 4 to 7 carbon atoms per molecule ($C_4$ to $C_7$), more preferably $C_4$ to $C_6$ aliphatic alkanes, which has been subjected to pretreating as described hereinabove to reduce its sulfur and water content. A spent reactivation stream which has been passed over the deactivated catalyst may be blended into finished products or sent to further processing in a refinery.

As described hereinabove for the isomerization process, reactivation may be effected on the catalyst in a fixed-bed system, a moving-bed system, a fluidized-bed system, or in a batch-type operation, with a fixed-bed system being preferred. Preferably, when isomerization is effected in two or more separate reactors with suitable means therebetween to isolate each reactor, one reactor may be regenerated while the other continues in isomerization service.

The process generally comprises a separation section, optimally comprising one or more fractional distillation columns having associated appurtenances and separating lighter components from the isomerized product. In addition, a fractionator may separate an isoparaffin concentrate from a cyclics concentrate with the latter optionally being recycled to a ring-cleavage step as described hereinabove.

Preferably part or all of the isomerized product and/or the isoparaffin concentrate are blended into finished gasoline along with other gasoline components from refinery processing including but not limited to one or more of butanes, butenes, pentanes, naphtha, catalytic reformate, isomerate, alkylate, polymer, aromatic extract, heavy aromatics; gasoline from catalytic cracking, hydrocracking, thermal cracking, thermal reforming, steam pyrolysis and coking; oxygenates such as methanol, ethanol, propanol, isopropanol, TBA, SBA, MTBE, ETBE, MTAE and higher alcohols and ethers; and small amounts of additives to promote gasoline stability and uniformity, avoid corrosion and weather problems, maintain a clean engine and improve driveability.

The process of the present invention utilizes a solid strong-acid catalyst comprising an anion-modified metal oxide and a zerovalent Group VIII (IUPAC 8–10) metal [See Cotton and Wilkinson, *Advanced Inorganic Chemistry*, John Wiley & Sons (Fifth Edition, 1988)]. The metal-oxide support comprises at least one oxide, hydroxide, oxyhydroxide or oxide-hydrate of Groups IVB (IUPAC 4), IIIA (IUPAC 13) and IVA (IUPAC 14) metals and iron. The favored form of the support depends upon the metal chosen; for example, zirconium hydroxide and aluminum oxide are the respective favored forms of these elements. Zirconia and titania are preferred metal-oxide supports, with zirconia being especially preferred.

The anion modifier generally is selected from one or more of sulfate and the oxide, hydroxide, oxyhydroxide or oxide-hydrate of metals of Groups VB (IUPAC 5), VIB (IUPAC 6), VIIB (IUPAC 7), VIII (IUPAC 8–10) and VA (IUPAC 15). Sulfate, tungstate and molybdate modifiers are preferred. Favored anion- modified metal oxides are tungstated zirconia and, particularly, sulfated zirconia.

The zerovalent Group VIII (IUPAC 8–10) metal component comprises one or more of the platinum-group metals and nickel. Preferably the component comprises at least one platinum-group metal component, i.e., platinum, palladium, ruthenium, rhodium, iridium, and osmium, with platinum being preferred. Usually most or substantially all of the platinum-group metal is present in the elemental state and is homogeneously dispersed within the carrier material.

The preferred zirconium oxide or hydroxide is converted via calcination to crystalline form. An anion modifier is composited with the catalyst by any suitable means, for example as a component of an initial slurry preparation along with the Group IVB metal hydroxide or by impregnation before or after calcination of the support. A platinum-group metal component is added to the catalytic composite by any means known in the art to effect the catalyst of the invention, e.g., by impregnation. Optionally, the catalyst is bound with a refractory inorganic oxide. The support, sulfate, metal components and optional binder may be composited in any order effective to prepare a catalyst useful for the isomerization of hydrocarbons.

Raw material for the support of the present catalyst may be purchased as a hydroxide of a Group IVB (IUPAC 4) metal. For example, suitable zirconium hydroxide is available from MEI of Flemington, N.J. Alternatively, the hydroxide may be prepared by hydrolyzing metal oxy-anion salt compounds, for example $ZrOCl_2$, $ZrO(NO_3)_2$, $Zr(OH)NO_3$, $ZrOSO_4$, $TiOCl_2$ and the like. The hydrolysis can be effected using a hydrolyzing agent such as ammonium hydroxide, sodium hydroxide, potassium hydroxide, sodium sulfate, $(NH_4)_2HPO_4$ and other such compounds known in the art. The metal oxy-anion salt may in turn be prepared from available materials, for example by treating $ZrOCO_3$ with nitric acid. The hydroxide as purchased or generated by hydrolysis preferably is dried at a temperature of from about 100 to 300° C. to vaporize volatile compounds.

A preferred sulfated support is prepared by treatment with a suitable sulfating agent to form a solid acid, optionally a solid superacid having acid strength or proton-donating ability at least as great as anhydrous sulfuric acid. Sulfate ion is incorporated into a catalytic composite, for example, by treatment with sulfuric acid in a concentration usually of from about 0.01–10N and preferably from about 0.1–5N. Compounds such as hydrogen sulfide, mercaptans or sulfur dioxide, which are capable of forming sulfate ions upon calcining, may be employed as alternative sources. Preferably ammonium sulfate is employed to provide sulfate ion to the catalytic composite. Sulfate is composited with the surface of the support material to form, it is believed without so limiting the invention, a mixture of Brönsted and Lewis acid sites. The sulfur content of the finished catalyst generally is in the range of about 0.5 to 5 mass-%, and preferably is from about 1 to 2.5 mass-%. The sulfated composite is dried, preferably followed by calcination at a temperature of about 500 to 700° C. particularly if the sulfation is to be followed by incorporation of the platinum-group metal.

A metal anion modifier may be present in the catalyst in any valence state above that of the elemental metal, as an oxyanion of the metal, and/or as a physical or chemical combination with the porous carrier material and/or other components of the catalytic composite. The anion modifier may be incorporated in the catalyst in any suitable manner to achieve a homogeneous dispersion, such as by coprecipitation with the porous carrier material, incorporation during the peptization of the inorganic oxide or impregnation of the carrier material at any stage in the preparation. One method of incorporating the modifier component into the catalyst composite involves the utilization of a soluble, decomposable compound of a first metal to impregnate and disperse the metal throughout the porous carrier material. The anion component can be impregnated either prior to, simultaneously with, or after the other components are added to the carrier material. Thus, the component may be added to the carrier material by commingling the latter with an aqueous solution of a suitable metal salt or soluble compound of the metal. The utilization of nitrate compounds, such as Mn(IV) nitrate, Fe(III) nitrate or Ni(II) nitrate is particularly preferred.

The preferred platinum-group metal component may be incorporated into a composite precursor of the catalyst in any suitable manner, such as by coprecipitation, ion-exchange or impregnation. The preferred method of incorporation involves the utilization of a soluble, decomposable compound of platinum-group metal to impregnate the carrier material in a relatively uniform manner. For example, the component may be added to the support by commingling the latter with an aqueous solution of chloroplatinic acid or tetraamine platinum chloride. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiamino- platinum, sodium tetranitroplatinate (II), palladium chloride, palladium nitrate, and the like. It generally is preferred to impregnate the carrier material after it has been calcined in order to minimize the risk of washing away the valuable platinum-group metal.

Usually the platinum-group metal component is dispersed homogeneously in the catalyst. Homogeneous dispersion of the platinum-group metal preferably is determined by Scanning Transmission Electron Microscope (STEM), comparing metals concentrations with overall catalyst metal content. In an alternative embodiment one or more platinum-group metal components may be present as a surface-layer component as described in U.S. Pat. No. 4,677,094, incorporated by reference. The "surface layer" is the layer of a catalyst particle adjacent to the surface of the particle, and the concentration of surface-layer metal tapers off in progressing from the surface to the center of the catalyst particle. In one aspect, the platinum-group metal may be incorporated by spray impregnation, for example, using a spray nozzle within a rotating drum which holds the catalytic composite. A solution of the metal salt is ejected using air to form fine droplets of spray which contact the support in the rotating drum for effective mixing. The volume ratio of solution support is sufficient to effect the desired level of metal in the catalyst, preferably from about 0.3 to 1.0.

Preferably the catalytic composition comprises a binder in order to provide catalyst particles in a convenient form according to the present invention. The binder usually comprises from about 2 to 50 mass-%, preferably from about 5 to 20 mass-%, of the finished catalyst. The art teaches that any refractory inorganic oxide binder is suitable. One or more of silica, alumina or magnesia are preferred binder materials of the present invention. The particularly preferred binder material is alumina, with eta- and/or especially gamma-alumina being favored.

The hydroxide and binder may be composited to form particle shapes known to those skilled in the art such as spheres, extrudates, rods, pills, pellets, tablets or granules. A preferred form of carrier material is a cylindrical extrudate, suitably prepared by mixing the alumina powder and catalyst carrier with water and suitable peptizing agents such as HCl until an extrudable dough is formed. The amount of water added to form the dough is typically sufficient to give a loss on ignition (LOI) at 500° C. of about 25 to 65 mass-%. The resulting dough is extruded through a suitably sized die to form extrudate particles. These particles are then dried at a temperature of about 260° to about 550° C. for a period of about 0.1 to 5 hours to form the extrudate particles. The preferred diameter of cylindrical extrudate particles is between about 0.7 and 3.5 mm, with a length-to- diameter ratio of between about 1:1 and 5:1.

Alternative spherical particles may be formed directly by the oil-drop method as disclosed hereinbelow or from extrudates by rolling extrudate particles on a spinning disk. Manufacture of spheres by the well known continuous oil-drop method comprises: forming an alumina hydrosol by any of the techniques taught in the art and converting the alumina hydrogel to the corresponding crystalline gamma-alumina. U.S. Pat. No. 2,620,314 provides details and is incorporated herein by reference thereto.

A catalyst support useful in the process of the invention may incorporate other porous, adsorptive, high-surface-area materials. Within the scope of the present invention are refractory supports containing one or more of: (1) refractory inorganic oxides such as alumina, silica, titania, magnesia, zirconia, chromia, thoria, boria or mixtures thereof, (2) synthetically prepared or naturally occurring clays and silicates, which may be acid-treated; (3) crystalline zeolitic aluminosilicates, either naturally occurring or synthetically prepared such as FAU, MEL, MFI, MOR, MTW (IUPAC Commission on Zeolite Nomenclature), in hydrogen form or in a form which has been exchanged with metal cations; (4) spinels such as $MgAl_2O_4$, $FeAl_2O_4$, $ZnAl_2O_4$; and (5) combinations of materials from one or more of these groups. Preferably, however, the solid strong-acid catalyst consists essentially of an anion-modified metal oxide, a zerovalent platinum-group metal and an inorganic-oxide binder.

EXAMPLES

The following examples serve to illustrate certain specific embodiments of the present invention. These examples should not, however, be construed as limiting the scope of the invention as set forth in the claims. There are many possible other variations, as those of ordinary skill in the art will recognize, which are within the spirit of the invention.

Example I

A paraffin-isomerization catalyst was prepared in order to illustrate the benefits of the invention. $Zr(OH)_4$ prepared by neutralizing $Zr(NO_3)_2$ with ammonia was spray-impregnated with a solution of $(NH_4)_2SO_4$, dried at 120° C. and 300° C., then calcined at 650° C. The resulting sulfated composite was spray- impregnated with a solution of chloroplatinic acid (CPA), dried at 120° C. and 300° C., then calcined at 600° C. The resulting finished catalyst had the following composition in mass-%:

| | |
|---|---|
| Platinum | 0.375 |
| Sulfur | 1.8 |

Example II

Performance tests were carried out to demonstrate the effectiveness of the reactivation process of the invention when isomerizing light hydrocarbons to increase the content of isoparaffins and resulting octane number as a gasoline blending component. The feedstock to the isomerization tests corresponded to a light straight-run naphtha and had the following composition in mass-%:

| | |
|---|---|
| $C_5$ paraffins | 46.7 |
| $C_6$ paraffins | 47.8 |
| Methylcyclopentane | 1.5 |
| Cyclohexane | 4.0 |

Example III

The isomerization tests were carried out at a pressure of about 1.8 kPa, mass hourly space velocity of 1.6, hydrogen/hydrocarbon mole ratio of 2.0 and programmed variable temperature at 14° C. intervals between 149 and 204° C.

Following an "Initial Reference" period using the above feedstock and conditions, the catalyst was subjected to two alternate feedstocks, one containing a higher proportion of pentanes (58.7 mass-%) and another a higher proportion of cyclic hydrocarbons (11.5 mass-%), the results of which are not pertinent here. The test then returned to the original feedstock for a "Final Reference" period, following which the catalyst had accumulated a total life of about 4 $m^3$ of feed per kg of catalyst.

At this point, the catalyst was subjected to regeneration according to the known art in vapor/liquid mixed phase for a period of 24 hours, using pentane and hydrogen at a molar ratio to pentane of 2.0. The temperature of the reactivation was about 65° C. at a pressure of about 1.8 MPa and mass hourly space velocity of 1.55. Following the reactivation, isomerization tests again were carried out using the same feedstock and conditions, including programmed variable temperature at 14° C. intervals between 149 and 204° C., as for the Initial and Final Reference periods.

A second reactivation then was effected according to the invention. The reactivation of the invention was carried out in the liquid phase for a period of 24 hours, using pentane as before but with hydrogen present at a reduced molar ratio to pentane of 0.02 and an increased pressure of about 3.2 MPa. The temperature of the reactivation was about 65° C. at a mass hourly space velocity of 3. Following the reactivation, isomerization tests again were carried out using the same feedstock and conditions, including programmed variable temperature at 14° C. intervals between 149 and 204° C., as for the prior periods.

Example IV

The results of the isomerization tests are plotted as FIG. 1. The results are expressed in terms of high-octane isomers as a proportion of the respective paraffin carbon numbers, i.e., isopentane ($iC_5$) as a proportion of pentanes and 2,2-dimethylbutane (2,2-DMB) as a proportion of total hexanes in mass-%. Such proportions are shown for a range of isomerization temperatures, as described hereinbefore, for the Initial Reference and Final Reference periods, after the first regeneration according to the known art, and after the reactivation of the invention. Performance after the reactivation of the invention was superior to that after the regeneration of the art, and close to that of the Initial Reference period with fresh catalyst.

Figure 2:
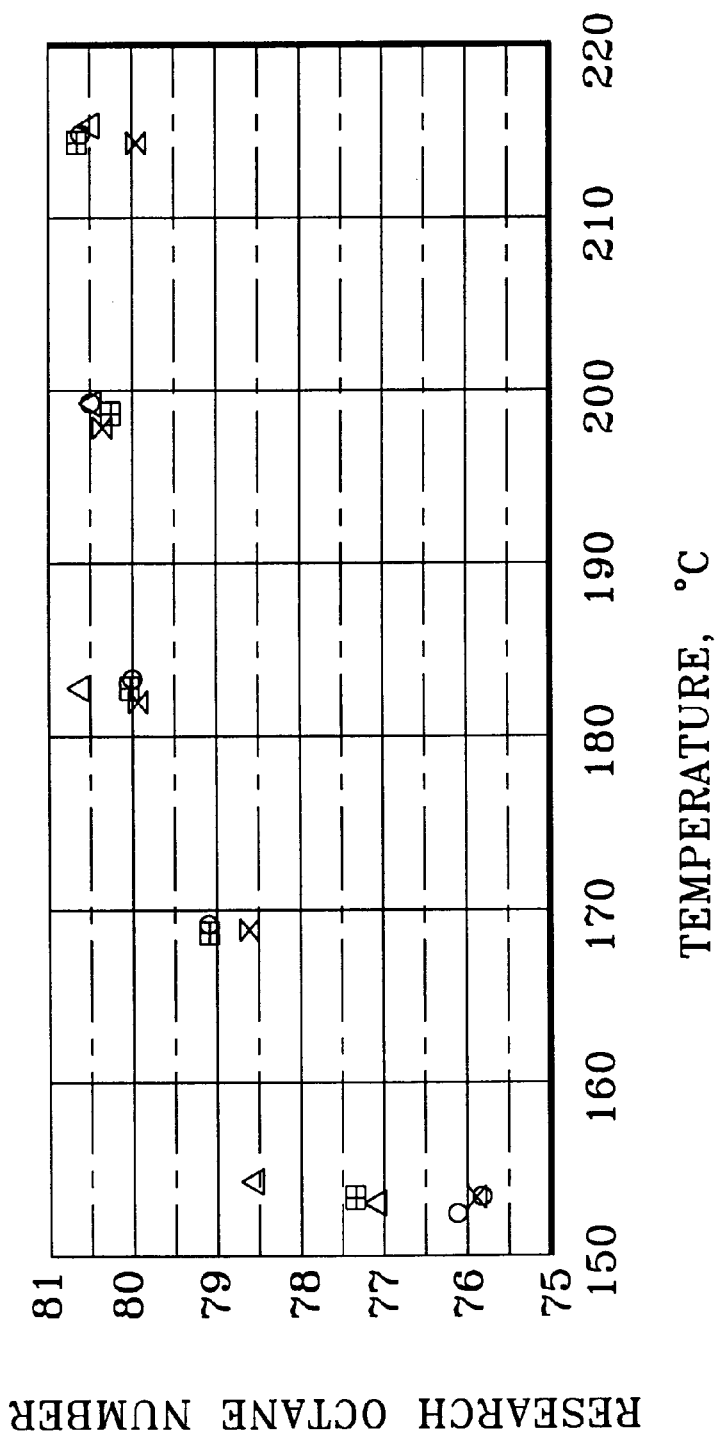
FIG. 2 compares isomerization performance in terms of product octane number for reactivated catalysts as in FIG. 1.

These superior results for the reactivation of the invention are confirmed in FIG. 2, which shows the product Research octane number for each temperature at each phase of the test.

An isomerization catalyst activity "k" was calculated for each stage of the test as described above, with the following results:

| Stage | Activity "k" |
|---|---|
| Initial Reference | 2.79 |
| Final Reference | 2.55 |
| Regeneration of Known Art | 2.49 |
| Reactivation of Invention | 2.69 |

The reactivation of the invention restored the activity of the catalyst far more effectively than the regeneration according to the known art.

I claim:

1. In a process for the isomerization of a naphtha feedstock to obtain an isomerized product having an increased isoparaffin content at paraffin- isomerization conditions comprising an isomerization temperature of from 40 to 250° C. in the presence of a solid strong-acid isomerization catalyst comprising an anion-modified metal oxide and a zerovalent platinum-group metal component thereby effecting a loss in isomerization activity of the catalyst and obtaining a deactivated catalyst, the improvement which comprises contacting the deactivated catalyst with a totally liquid-phase hydrocarbon stream at reactivation conditions comprising a reactivation temperature at least about 20° C. lower than the isomerization temperature to obtain a reactivated catalyst and reutilizing the reactivated catalyst in the isomerization process.

2. The process of claim 1 wherein the reactivation temperature is at least about 30° C. lower than the isomerization temperature.

3. The process of claim 2 wherein the reactivation temperature is at least about 50° C. lower than the isomerization temperature.

4. The process of claim 1 wherein the reactivation conditions comprise a temperature of from about 20 to 200° C., pressure of from 300 kPa to 4 MPa, and liquid hourly space velocity of from 0.5 to 15 $hr^{-1}$, and wherein free hydrogen is associated with the hydrocarbon stream in an amount of from about 0.01 moles per mole of $C_5+$ hydrocarbons to the hydrogen saturation limit at reactivation conditions.

5. The process of claim 1 wherein the liquid-phase hydrocarbon stream comprises naphtha comprising $C_4$ to $C_7$ alkanes and cycloalkanes.

6. The process of claim 1 wherein the deactivated catalyst comprises less than about 0.5 mass-% carbon.

7. The process of claim 1 wherein the reactivated catalyst comprises less than about 0.1 mass-% carbon.

8. The process of claim 1 wherein the isomerization conditions comprise a pressure of from 100 kPa 10 MPa and liquid hourly space velocity of from 0.2 to 25 $hr^{-1}$ and wherein free hydrogen is associated with the naphtha feedstock in an amount of from about 0.01 to 20 moles per mole of feedstock.

9. The process of claim 1 wherein the catalyst comprises a sulfated support comprising at least one of the oxides and hydroxides of elements of Group IVB (IUPAC 4) of the Periodic Table.

10. The process of claim 9 wherein the element of Group IVB (IUPAC 4) comprises zirconium.

11. The process of claim 1 wherein the sulfated support further comprises from about 2 to 25 mass-% of a refractory inorganic-oxide binder.

12. The process of claim 1 wherein the platinum-group metal component comprises platinum.

13. In a process for the isomerization of a naphtha feedstock to obtain an isomerized product having an increased isoparaffin content at paraffin- isomerization conditions comprising an isomerization temperature of from 40 to 250° C. in the presence of a solid strong-acid isomerization catalyst comprising sulfated zirconia and a platinum-group metal component thereby effecting a loss in isomerization activity of the catalyst and obtaining a deactivated catalyst, the improvement which comprises contacting the deactivated catalyst with a totally liquid- phase hydrocarbon stream at reactivation conditions comprising a reactivation temperature at least about 20° C. lower than the isomerization temperature to obtain a reactivated catalyst and reutilizing the reactivated catalyst in the isomerization process.

14. The process of claim 13 wherein the reactivation conditions comprise a temperature of from about 20 to 200° C., pressure of from 300 kPa to 4 MPa, and liquid hourly space velocity of from 0.5 to 15 $hr^{-1}$, and wherein free hydrogen is associated with the hydrocarbon stream in an amount of from about 0.01 moles per mole of $C_5+$ hydrocarbons to the hydrogen saturation limit at reactivation conditions.

15. The process of claim 14 wherein the reactivation temperature is at least about 300° C. lower than the isoerization temperature.

16. The process of claim 15 wherein the reactivation temperature is at least about 50° C. lower than the isomerization temperature.

17. In a process for the isomerization of a naphtha feedstock to obtain an isomerized product having an increased isoparaffin content at paraffin- isomerization conditions comprising an isomerization temperature of from 40 to 250° C. in the presence of a solid strong-acid isomerization catalyst comprising alumina-bound sulfated zirconia and a platinum-group metal component thereby effecting a loss in isomerization activity of the catalyst and obtaining a deactivated catalyst, the improvement which comprises contacting the deactivated catalyst with a totally liquid-phase hydrocarbon stream at reactivation conditions comprising a reactivation temperature at least about 20° C. lower than the isomerization temperature to obtain a reactivated catalyst and reutilizing the reactivated catalyst in the isomerization process.

18. The process of claim 17 wherein the reactivation conditions comprise a temperature of from about 20 to 200° C., pressure of from 300 kPa to 4 MPa, and liquid hourly space velocity of from 0.5 to 15 $hr^{-1}$, and wherein free hydrogen is associated with the hydrocarbon stream in an amount of from about 0.01 moles per mole of $C_5+$ hydrocarbons to the hydrogen saturation limit at reactivation conditions.

19. The process of claim 18 wherein the reactivation temperature is at least about 30° C. lower than the isomerization temperature.

20. The process of claim 19 wherein the reactivation temperature is at least about 50° C. lower than the isomerization temperature.

* * * * *